(12) United States Patent
Heath et al.

(10) Patent No.: US 6,850,498 B2
(45) Date of Patent: *Feb. 1, 2005

(54) METHOD AND SYSTEM FOR EVALUATING A WIRELESS LINK

(75) Inventors: Robert W. Heath, Mountain View, CA (US); Jose Tellado, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 905 days.

This patent is subject to a terminal disclaimer.

(21) Appl. No.: 09/745,767

(22) Filed: Dec. 22, 2000

(65) Prior Publication Data

US 2002/0080735 A1 Jun. 27, 2002

(51) Int. Cl.[7] .................................................. H04Q 7/00
(52) U.S. Cl. ...................... 370/328; 370/329; 370/332; 375/225
(58) Field of Search ........................... 370/312, 319–321, 370/324, 328–330, 332–336, 344–345, 400, 432, 436, 465; 375/220–221, 225, 227, 254, 259, 285, 295, 377; 714/708–709

(56) References Cited

U.S. PATENT DOCUMENTS

| | | | | |
|---|---|---|---|---|
| 5,815,488 | A | 9/1998 | Williams et al. | 370/206 |
| 5,933,421 | A | 8/1999 | Alamouti et al. | 370/330 |
| 6,064,662 | A | 5/2000 | Gitlin et al. | 370/330 |
| 6,067,290 | A | 5/2000 | Paulraj et al. | 370/329 |
| 6,072,990 | A | * 6/2000 | Agrawal et al. | 455/69 |
| 6,144,711 | A | 11/2000 | Raleigh et al. | 375/347 |
| 6,154,489 | A | * 11/2000 | Kleider et al. | 375/221 |
| 6,175,550 | B1 | 1/2001 | van Nee | 370/206 |
| 2002/0056066 | A1 | * 5/2002 | Gesbert et al. | 714/759 |

FOREIGN PATENT DOCUMENTS

| | | |
|---|---|---|
| EP | 0 951 091 A2 | 10/1999 |
| WO | WO98/09381 | 5/1998 |

OTHER PUBLICATIONS

Paulraj, A., *Taxonomy of space–time processing for wireless networks*, IEE Proc—Radar Sonar Navig., vol. 145, No. 1, Feb. 1998.

* cited by examiner

*Primary Examiner*—Wellington Chin
*Assistant Examiner*—John Shew
(74) *Attorney, Agent, or Firm*—Michael A. Proksch

(57) ABSTRACT

A wireless link between a first transmitter and a first receiver in a multiple access communications system is evaluated by receiving, at the first transmitter, information that is intended for a second receiver and that is transmitted in a second transmission mode that is different from the current transmission mode and obtaining an error measure for the information that is received at the first receiver and intended for the second receiver. The obtained error measure is then used to determine if the second transmission mode is an acceptable transmission mode. In an embodiment, if the second transmission mode is determined to be acceptable, then the current transmission mode of the first receiver can be replaced by the second transmission mode. In an embodiment, the current transmission mode is replaced by the second transmission mode only if the second transmission mode is a "higher" transmission mode than the current transmission.

52 Claims, 8 Drawing Sheets

| Cycle | Current Mode | Eavesdrop mode that is acceptable | Mode Ranking | Mode Decision |
|---|---|---|---|---|
| | | Receiver A Example Mode Cycles | | |
| 1 | Mode 4 | Mode 2 | Mode 4 > Mode 2 | Mode 4 |
| 2 | Mode 4 | Mode 5 | Mode 4 < Mode 5 | Mode 5 |
| 3 | Mode 5 | Mode 7 | Mode 5 < Mode 7 | Mode 7 |
| 4 | Mode 7 | Mode 3 | Mode 7 > Mode 3 | Mode 7 |
| 5 | Mode 7 | Mode 6 | Mode 7 > Mode 6 | Mode 7 |
| 6 | Mode 7 | -mode lowered | to mode 4 - | |
| 7 | Mode 4 | Mode 5 | Mode 4 < Mode 5 | Mode 5 |
| 8 | Mode 5 | Mode 8 | Mode 5 < Mode 8 | Mode 8 |
| 9 | Mode 8 | Mode 7 | Mode 8 < Mode 7 | Mode 8 |
| 10 | Mode 8 | | | |

FIG. 5

| | Ranking of acceptable modes | Running BER |
|---|---|---|
| | 8 | 0.0075 |
| | 6 | 0.0080 |
| | 5 | 0.0041 |
| Current Mode Pointer → | 4 | 0.0012 |
| | 3 | 0.0008 |
| | 1 | 0.0003 |

Database of Acceptable Modes

FIG. 7

METHOD AND SYSTEM FOR EVALUATING A WIRELESS LINK

FIELD OF THE INVENTION

The invention relates generally to wireless communications systems that use multiple access protocols. More particularly, the invention relates to a method and system for evaluating a wireless link between a transmitter and receiver pair in a wireless communications system and for adapting the wireless link in response to the evaluation.

BACKGROUND OF THE INVENTION

Wireless communications systems use multiple access protocols, such as time-division multiple access (TDMA), frequency-division multiple access (FDMA), code-division multiple access (CDMA), and space-division multiple access (SDMA) protocols, to enable wireless communications between base transceiver stations and multiple subscriber units. Typically, a wireless communications system includes multiple base transceiver stations that are spaced to create subscriber cells. Subscriber units within the subscriber cells, which may include mobile or fixed units, exchange information between a nearby base transceiver station over a dedicated radio frequency.

The use of wireless communications system is rapidly expanding beyond the exchange of voice communications to include the exchange of bandwidth intensive multimedia data transmissions. For example, a single wireless link between a base transceiver station and a subscriber unit may be utilized to simultaneously exchange voice, video, and data. In order to effectively deliver different media types over the same wireless link, wireless links must be able to reliably maintain certain minimum performance levels. Some common performance levels are defined in terms of data rate, capacity, delay, loss rate, and error rate.

The performance of a wireless link is primarily a function of the operating parameters of a transmitter-receiver pair and the channel characteristics that exist between the transmitter-receiver pair. The operating parameters of a transceiver-receiver pair include the transmit power, the coding scheme, the modulation rate, and the guard region. The operating parameters can typically be controlled to a relatively high degree of accuracy. The channel characteristics that exist between the transmitter-receiver pair include ambient noise, co-channel interference, adjacent channel interference, propagation path loss, and multi-path fading. In contrast to the operating parameters, the channel characteristics that exist between a transmitter-receiver pair are hard to control and tend to vary with time.

In order to maintain a given performance level of a wireless link between a transmitter-receiver pair when the channel characteristics vary with time, the operating parameters of the transceiver-receiver pair must adapt to account for the hard to predict variations of the channel characteristics. One technique for maintaining a wireless link involves measuring certain transmission parameters of the wireless link such as delay spread, signal-to-noise ratio, channel-to-interference (C/I) ratio, Doppler shift, and k-factor and then using the measured parameter(s) to predict how the current operating parameters should be changed to maintain the performance level of the wireless link. Predicting how a current operating parameter(s) should be changed often involves consulting look-up tables or analytical performance curves, which try to estimate a future performance level from a given set of operating parameters and/or measured transmission parameters. While this technique works well, the look-up tables and analytical performance curves do not always accurately reflect the performance of an actual wireless link that is effected by a unique set of link conditions and therefore the operating parameter adjustments may not be ideal for the actual link conditions.

Another technique for maintaining a wireless link involves decoding received information and measuring the error rate of the transmission that is being conducted under a given set of operating parameters and channel characteristics. The operating parameters of the transceiver-receiver pair are then adapted in response to the measured error rate. An example of a wireless link that is adapted in response to a measured error rate is disclosed in U.S. Pat. No. 6,072,990 issued to Agrawal et al. (hereinafter Agrawal). In Agrawal, information intended for the receiver is decoded and a word error rate (WER) over a given timeframe is observed (observed WER). The observed WER is compared to upper and lower WER thresholds and the operating parameters of the transceiver-receiver pair are modified if the observed WER fall outside of the WER window that is defined by the upper and lower WER thresholds. Determining how to modify the operating parameters to force the observed WER into the WER window is based on theoretical calculations. Although the techniques disclosed in Agrawal work well, modifications to the operating parameters of the transceiver-receiver pair are made in response to the measured error from a single set of operating parameters. That is, the operating parameters of the transceiver-receiver pair do not change while the error rate information is calculated. Because the performance of the wireless link is measured under a single set of operating parameters, the error rate that will result from modifying the current set of operating parameters is unknown. Therefore, maintaining the link may require multiple changes in the operating parameters before the desired set of operating parameters is found.

In addition to maintaining a wireless link at a minimum performance level, it may also be desirable to improve the performance level of a wireless link between a transmitter and a receiver by, for example, increasing the data rate of the link while still maintaining a minimum error rate. One technique for improving the performance level of a wireless link involves transmitting training frames intended for the receiver at a higher transmission rate than the data frames. The performance of the training frames can then be evaluated under actual conditions before the data frames are transmitted to the receiver at the higher transmission rate. Although this technique gives good performance feedback, the transmission of training frames consumes link bandwidth that may be in limited supply during heavy traffic conditions.

In view of the demand on wireless communications systems to deliver different media types over the same wireless link at reliable performance levels and the large number of variables that effect the quality of each wireless link, what is needed is a system and method for evaluating a wireless link that reflects actual operating conditions and does not waste limited link bandwidth.

SUMMARY OF THE INVENTION

A system and method for evaluating a wireless link between a first transmitter and a first receiver in a multiple access communications system involves receiving, at the first transmitter, information that is intended for a second receiver and that is transmitted in a second transmission mode that is different from the current transmission mode, and obtaining an error measure for the information that is received at the first receiver and intended for the second receiver. The obtained error measure is then used to determine if the second transmission mode is an acceptable transmission mode. In an embodiment, if the second transmission mode is determined to be acceptable, then the current transmission mode of the first receiver can be replaced by the second transmission mode. By obtaining an error measure for information that is transmitted in a different transmission mode, a wireless link that utilizes the different transmission mode can be evaluated from actual transmission results. In addition, because the evaluation is based on information that is intended for another receiver, the evaluation of the link does not consume additional link bandwidth.

A method for evaluating a wireless link between a transmitter and a first receiver in a multiple access wireless communications system where the transmitter is transmitting information intended for a first receiver in a first transmission mode and information intended for the second receiver in a second transmission mode that is different from the first transmission mode involves receiving, at the first receiver, the information that is intended for the second receiver and that is transmitted in the second transmission mode. At the first receiver, an error measure is obtained for the information that is received at the first receiver and intended for the second receiver and then a determination is made as to whether or not the second transmission mode is an acceptable transmission mode at least in part based on the error measure obtained for the information that is received at the first receiver and intended for the second receiver.

An embodiment of the method includes determining if the second transmission mode should be used for subsequent transmissions of information frames that is intended for the first receiver only if the second transmission mode is determined to be acceptable. In an embodiment, the step of determining if the second transmission mode should be used for subsequent transmissions of information includes a step of comparing a characteristic of the second transmission mode to the first transmission mode.

In an embodiment, the step of determining if the second transmission mode should be used for subsequent frame transmissions includes a step of determining if the second transmission mode is higher than a current transmission mode that is used to transmit information intended for the first receiver. If the second transmission mode is determined to be higher than the current transmission mode, then the second transmission mode is used for subsequent transmissions, from the transmitter, of information intended for the first receiver. If the second transmission mode is determined to be lower than the current transmission mode, then the current transmission mode is used for subsequent transmissions, from the transmitter, of information intended for the first receiver.

An embodiment of the method further includes a step of indicating to the transmitter that the second transmission mode should be used for subsequent transmissions of frames intended for the first receiver.

A system for evaluating a wireless link in a multiple access wireless communications system includes a transmitter, a first receiver, and a second receiver. The transmitter transmits information intended for the first receiver in a first transmission mode and transmits information intended for the second receiver in a second transmission mode that is different from the first transmission mode. The first receiver receives, from the transmitter, the information that is intended for the second receiver and that is transmitted in the second transmission mode, obtains an error measure for the information that is received at the first receiver and intended for the second receiver, and then determines if the second transmission mode is an acceptable transmission mode at least in part based on the error measure obtained for the information.

In an embodiment of the system the first receiver includes mode logic for determining if the second transmission mode should be used for subsequent transmissions of information that is intended for the first receiver only if the second transmission mode is determined to be acceptable. In an embodiment, the mode logic includes logic for determining if the second transmission mode is higher than a current transmission mode that is used to transmit information intended for the first receiver. If the second transmission mode is determined to be higher than the current transmission mode, then the second transmission mode is used for subsequent transmissions, from the transmitter, of information intended for the first receiver. If the second transmission mode is determined to be lower than the current transmission mode, then the current transmission mode is used for subsequent transmissions, from the transmitter, of information intended for the first receiver.

An embodiment of the system includes mode logic for determining if the obtained error measure is above or below an error threshold.

In an embodiment, the first receiver includes a mode database and mode logic which adds the second transmission mode to the mode database only if the second transmission mode is determined to be acceptable. In an embodiment, the mode logic ranks transmission modes that are added to the mode database. In an embodiment a new transmission mode is selected for information intended for the first receiver at least in part based on the transmission mode rankings.

In an embodiment, error statistics are accumulated for transmission modes that are added to the mode database.

In an embodiment, the first receiver includes mode logic for projecting the acceptability of other transmission modes that may be used to transmit information intended for the first receiver based at least in part on the mode acceptability determination.

In an embodiment, error measures are obtained after the information has been decoded by the decoder.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 depicts example mode cycles resulting from application of the decision logic described in FIGS. 3 and 4.

FIG. 7 depicts an example of mode information, including a ranked list of acceptable transmission modes, that may be stored in a mode database.

DETAILED DESCRIPTION OF THE INVENTION

A system and method for evaluating a wireless link between a first transmitter and a first receiver in a multiple access communications system involves receiving, at the first transmitter, information that is intended for a second receiver and that is transmitted in a second transmission mode that is different from the current transmission mode, and obtaining an error measure for the information that is received at the first receiver and intended for the second receiver. The obtained error measure is then used to determine if the second transmission mode is an acceptable transmission mode. In an embodiment, if the second transmission mode is determined to be acceptable, then the current transmission mode of the first receiver can be replaced by the second transmission mode. In an embodiment, the current transmission mode is replaced by the second transmission mode only if the second transmission mode is a "higher" transmission mode than the current transmission. By obtaining an error measure for information that is transmitted in a different transmission mode, a wireless link that utilizes the different transmission mode can be evaluated from actual transmission results. In addition, because the evaluation is based on information that is intended for another receiver, the evaluation of the link does not consume additional link bandwidth.

Figure 1:
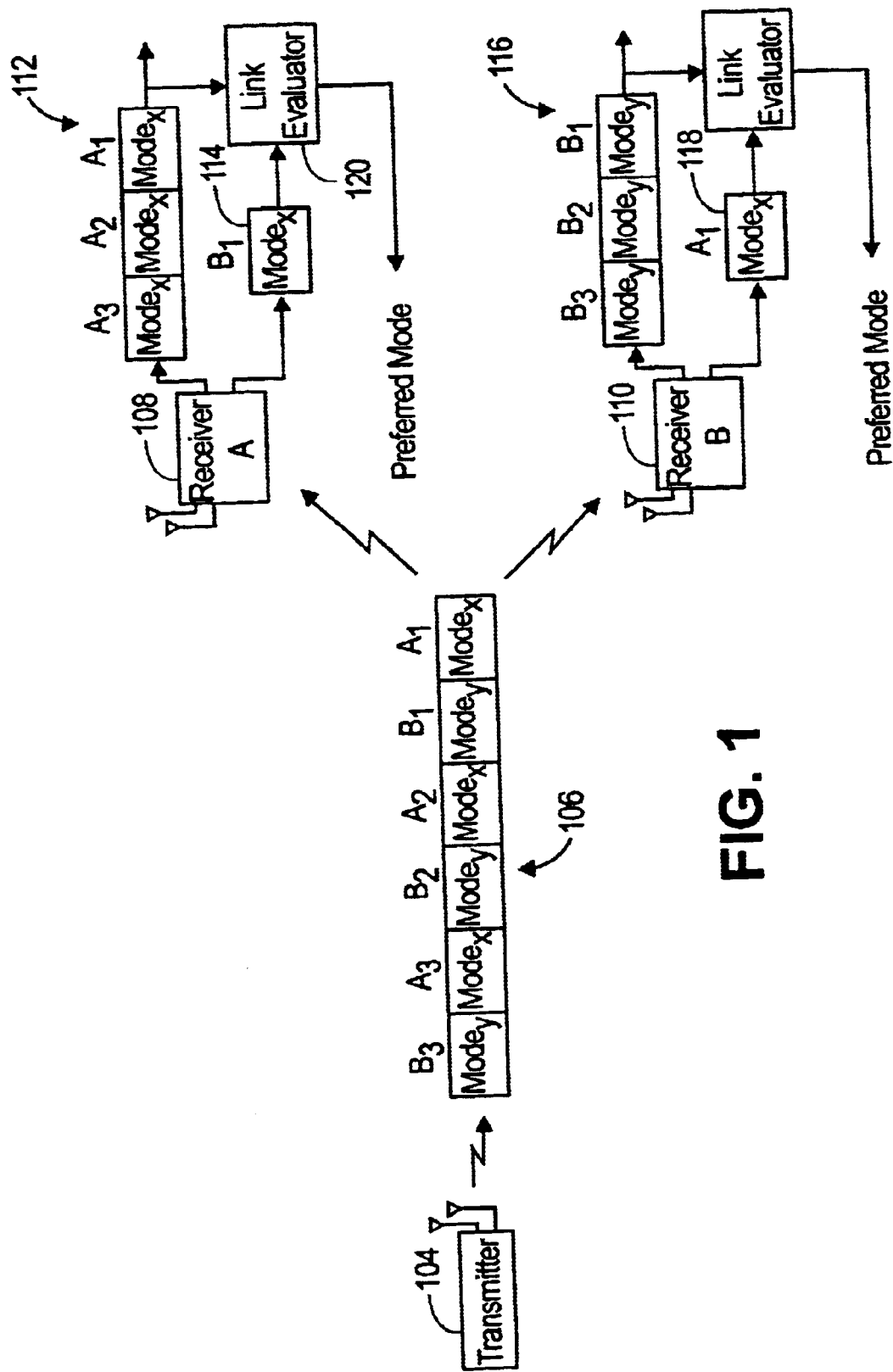
FIG. 1 represents a technique for evaluating a wireless link between a transmitter and a receiver in accordance with an embodiment of the invention.

FIG. 1 represents a technique for evaluating a wireless link between a transmitter and a receiver. FIG. 1 includes information, in the form of a stream of frames 106, that is transmitted from a transmitter 104 to two receivers 108 and 110 using a multiple access protocol. Within FIG. 1, the transmission mode used to transmit each frame in the stream is identified within each frame and the intended receiver of each frame, as controlled by a multiple access protocol, is identified above each frame.

Receiver A 108 receives and decodes the frames that are intended for Receiver A as depicted by the upper stream of frames 112 that is output from Receiver A. For description purposes, and as depicted in FIG. 1, the frames that are intended for Receiver A are transmitted in Mode X. In addition to the frames that are intended for Receiver A, Receiver A also decodes at least one frame that is intended for a different receiver (Receiver B) and that is transmitted in a different mode from the mode being used to transmit the Receiver A frames. In the embodiment of FIG. 1, Receiver A decodes one of the Receiver B frames (e.g., frame $B_1$) that is transmitted in mode Y as depicted by the lower frame 114.

Receiver B 110 receives and decodes the frames that are intended for Receiver B as depicted by the upper stream of frames 116 that is output from Receiver B. For description purposes and as depicted in FIG. 1, the frames that are intended for Receiver B are transmitted in mode Y. In addition to the frames that are intended for Receiver B, Receiver B also decodes at least one frame that is intended for a different receiver (Receiver A) and that is transmitted in a different mode from the mode being used to transmit the Receiver B frames. In the embodiment of FIG. 1, Receiver B decodes one of the Receiver A frames (e.g., frame $A_1$) that is transmitted in mode X as depicted by the lower frame 118.

Referring to Receiver A 108 for example purposes, the Receiver B frame (frame $B_1$) that is decoded by Receiver A is utilized by a link evaluator 120 to evaluate the performance of the wireless link that is created between the transmitter 104 and the receiver using mode Y. In an embodiment, the link evaluator obtains an error measure for the Receiver B frame and then determines if the transmission mode (mode Y) used to transmit the Receiver B frame is acceptable. By "eavesdropping" on a frame that is intended for a different receiver and that is transmitted in a different mode from the current mode, the actual performance of the wireless link using the different transmission mode can be evaluated. Because the frame that is used to evaluate the different mode (e.g., frame $B_1$) is a frame that is intended for a different receiver (Receiver B), no additional bandwidth is consumed by the evaluation process. The process is also performed by Receiver B by using a Receiver A frame (e.g., frame $A_1$) to evaluate a different transmission mode from the mode that is currently used for Receiver B.

Figure 2:
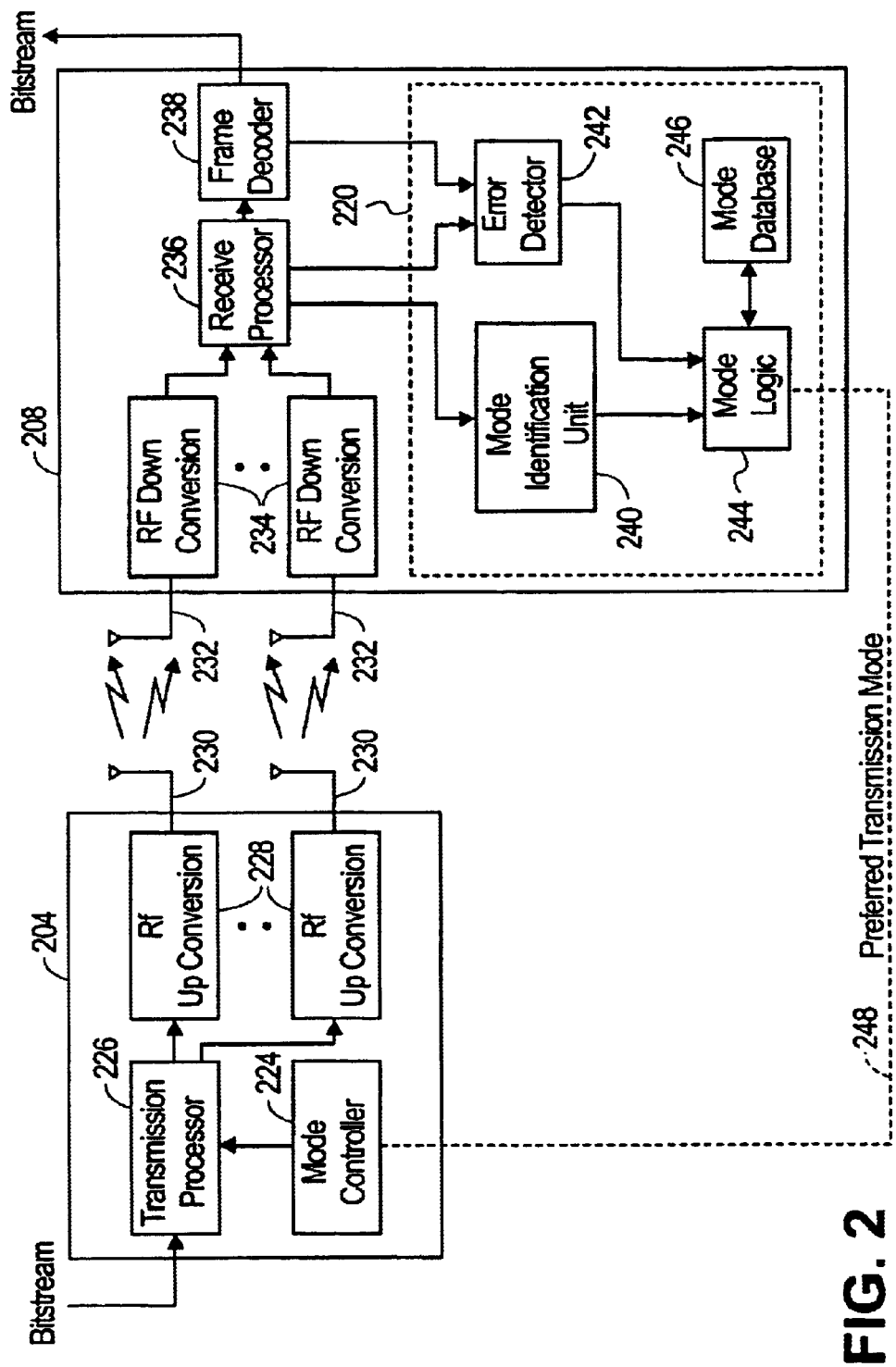
FIG. 2 depicts an expanded view of the transmitter and one receiver from FIG. 1 that are utilized to evaluate a wireless link in accordance with an embodiment of the invention.

FIG. 2 depicts an expanded view of the transmitter 204 and Receiver A 208 from FIG. 1, that are utilized to evaluate a wireless link. FIG. 2 also depicts an expanded view of the link evaluator 220. Where appropriate, similar reference numbers are used to identify similar elements. In the embodiment of FIG. 2, the transmitter includes a mode controller 224, a transmission processor 226, RF up-conversion units 228, and antennas 230. The receiver includes antennas 232, RF down-conversion units 234, a receive processor 236, a frame decoder 238, and the link evaluator 220. The link evaluator includes a mode identification unit 240, an error detector 242, mode logic 244, and a mode database 246. In an embodiment, the transmitter is located within a base transceiver station and the receiver is located within a subscriber unit. Alternatively, the transmitter is located within the subscriber unit and the receiver is located within the base transceiver station. In an embodiment, both the base transceiver station and the subscriber unit may include the link evaluation and mode adaptation capabilities that are described below. In an embodiment, the subscriber unit is a mobile device, such as a mobile telephone or a personal digital assistant (PDA), and in another embodiment, the subscriber unit includes customer premise equipment (CPE) that supports a fixed wireless access (FWA) system.

In an embodiment, the transmitter-receiver pair support diversity communications and in another embodiment, the transmitter-receiver pair support spatial multiplexing as described in U.S. Pat. Nos. 5,335,599 and 6,067,290, both of which are incorporated by reference herein. In an embodiment, the transmitter-receiver pair support a hybrid of diversity communications and spatial multiplexing. Multiple access protocols that may be utilized by the wireless communications system include TDMA, FDMA, CDMA, SDMA, orthogonal frequency division multiple access (OFDMA), wavelength division multiple access (WDMA), wavelet division multiple access, orthogonal division multiple access (ODMA), quasi-ODMA, packet reservation multiple access (PRMA), and carrier sense multiple access (CSMA) protocols.

Referring first to the transmitter 204, the mode controller 224 controls the transmission mode that is used to transmit each frame of information. A transmission mode is defined by the settings of various transmission parameters. Example transmission parameters which help to define a transmission mode include, but are not limited to; the transmit power, the transmit frequency, the coding scheme, the modulation scheme, the framing scheme, the modulation rate, the bandwidth, the guard region, frame size, slot allocation, cell plan, transmission diversity, spatial multiplexing, diversity, and whether transmissions are made from a single base station or multiple base stations. The transmission modes can be utilized in different combinations and settings to create an extremely large set of possible transmission modes. Although an extremely large set of transmission modes is possible, in an embodiment, a limited set of preferred transmission modes are used to exchange information between the transmitter-receiver pair. Typically, the transmission mode is selected to meet a pre-defined performance measure that is defined in terms of, for example, data rate, throughput, capacity, delay, and/or quality of service. Transmission modes are often compared to each other in terms of the transmission rate that is achieved by each mode. For example, a first mode is considered "higher" than a second mode if the first mode has a faster transmission rate. The terms "higher mode" and "lower mode" are used herein to describe modes with faster or slower transmission rates.

The transmission processor 226 processes incoming bitstreams and prepares the incoming bitstreams for transmission to the receiver 208 using a transmission mode that is dictated by the mode controller 224. Although not specifically depicted or described herein, the transmission processor performs functions such as framing, coding, symbol mapping, pulse shaping, digital-to-analog conversion, and modulation as is known in the field of wireless communications systems. As is known in multiple access protocols, incoming bitstreams are typically segmented into discrete units of information. In a TDMA system, frames are a division of time and in a CDMA system, frames are a division of time and frequency that are identified by receiver specific codes. Throughout the document, the term "frame" is used to describe any discrete unit of information that is transmitted using a multiple access protocol. RF signals representing the frames of information are generated by the RF up-conversion units 228 and transmitted from the antennas 230. The RF up-conversion units and antennas are well known in wireless communications systems and are not described further.

Referring second to the receiver 208, the antennas 232 and the RF down-conversion units 234 receive the RF signals from the transmitter 204 and down-convert the RF signals to electrical signals that represent the transmitted frames. The receive processor 236 processes the electrical signals from the transmitted frames. Functions performed by the receive processor may include amplification, demodulation, analog-to-digital conversion, equalization, and filtering as is known in the field of wireless communications systems. The processed electrical signals are sent to the frame decoder 238 where the signals are decoded into digital frames, for example, frames $A_1$, $A_2$, and $A_3$. The digital frames include the bitstream that is being communicated between the transmitter-receiver pair.

The mode identification unit 240 within the link evaluator 220 identifies the mode of incoming frames. In the embodiment of FIG. 2, frame information from the receive processor 236 is used by the mode identification unit to identify the transmission mode that was used to transmit the received frames. In an embodiment, the mode identification unit includes signal processing circuitry which analyzes the received signals to locally determine the transmission mode that was used to transmit the received frames. In another embodiment, a transmission mode indicator is included with the frame transmissions and in another embodiment, the transmission mode is identified in a control frame or a control channel. The transmission mode indicator is detected by the mode identification unit of the receiver and indicates the transmission mode of the received frames. Whether the transmission mode of received frames is determined locally or identified through a mode indicator or a control channel, the transmission modes of received frames are sent as transmission mode information to the mode logic 244 to be used as described below.

The error detector 242 within the link evaluator 220, determines if any of the incoming frames were incorrectly received or decoded. In an embodiment, error measure related to received frames is obtained after the received frames have been decoded and in another embodiment, an error measure is obtained from frame related information prior to frame decoding. In an embodiment where error detection is performed after frame decoding, error detection may include techniques based on either soft or hard decision information. Soft decision error measures may include the metric of a winning path in a Virterbi decoder or the output bit/symbol/packet likelihood. Hard decision error measures may be generated as a result of utilizing any block code known in the art including cyclic redundancy check (CRC) codes, parity check codes, Reed-Solomon codes, BCH codes, Hamming codes, cyclic codes, arithmatic codes, and Golay codes. In an embodiment, the CRC is used to estimate a desired error statistic such as a bit error rate (BER), a frame error rate (FER), a packet error rate (PER), or a word error rate (WER). Other techniques such as the Reed-Solomon technique for error detection may be utilized to generate error measures from decoded frames. More complex error statistics may also be generated from the error measures.

Parameters that may be used to compute error measures prior to frame decoding include mean square error of equalizer, a measure of equalizer convergence, and post processing signal to noise plus interference (SINR) ratio. Although some specifics related to error detection have been described, the key function of the error detector 242 is that some error measure is made related to the frame or frames intended for another receiver that are received in a particular transmission mode. After the error measure is made by the error detector, it is provided to the mode logic 244 to be used as described below.

The mode logic 244 within the link evaluator 220 takes the error measure from the error detector and determines whether or not the subject transmission mode is an acceptable transmission mode. In an embodiment, determining whether or not the transmission mode is acceptable involves determining whether or not the error measure is above or below an error threshold. The mode logic can use the mode acceptability determination in various ways, as described below, to adapt the wireless link. In an embodiment, the mode acceptability determination involves comparing the error measure, for example a BER, for a frame or group of frames to an error threshold, for example a BER threshold. In an embodiment, an error threshold, such as a BER threshold, is established as the maximum error rate that is acceptable on the wireless link. If the error measure for a received frame or group of frames is above the error threshold, then the transmission mode is determined to be unacceptable. If the error measure for a received frame or group of frames is below the error threshold, then the transmission mode is determined to be acceptable. Typically, the error threshold is communicated from a base transceiver station to a subscriber unit. In an embodiment, the error threshold is related to a minimum quality of service that is guaranteed to a subscriber.

Figure 3:
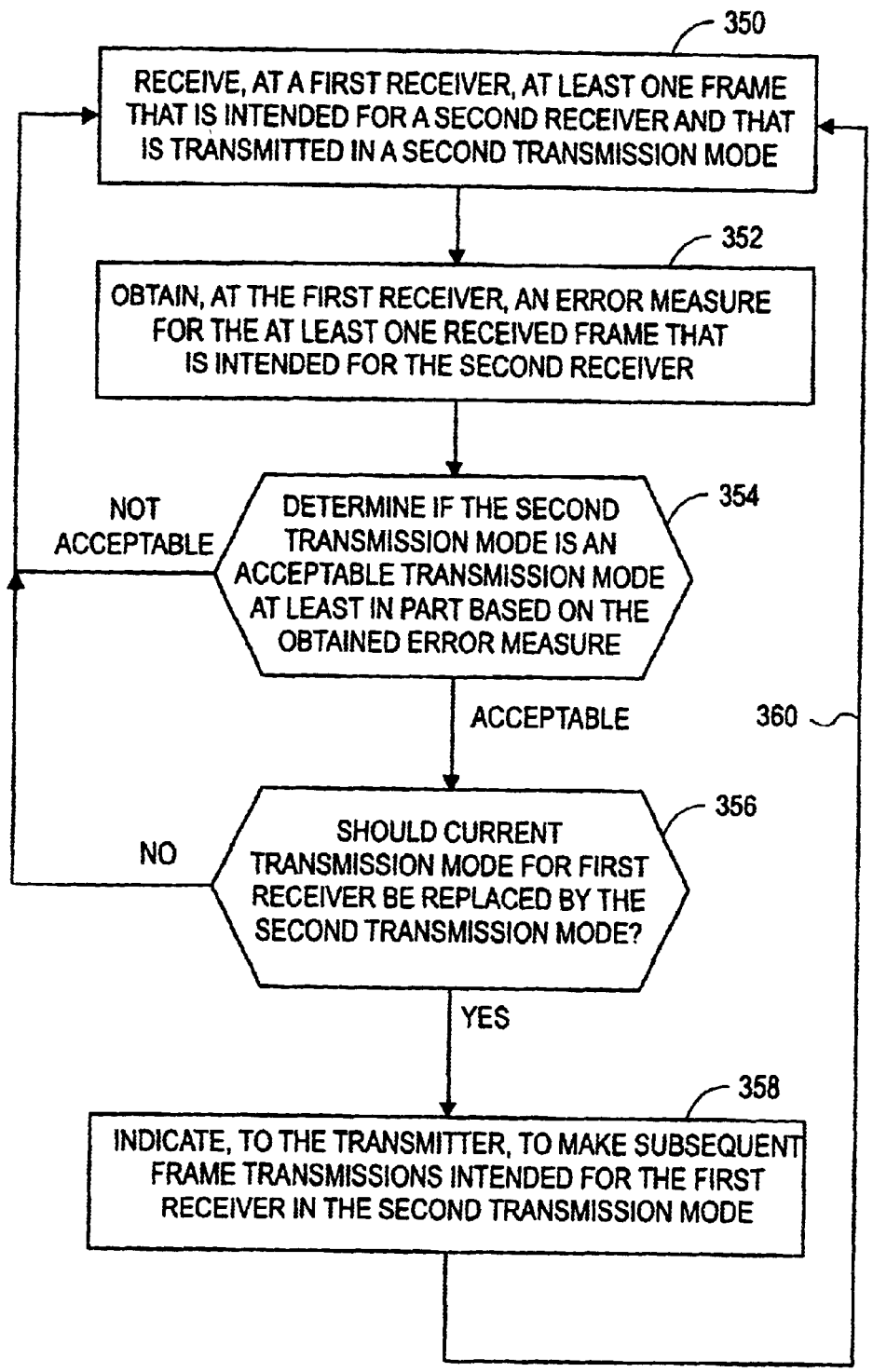
FIG. 3 depicts a process flow diagram of a method for evaluating a wireless link in a multiple access wireless communications system that includes a transmitter, a first receiver, and a second receiver.

In an embodiment, the mode acceptability determination is used to determine whether the current transmission mode for frames intended for a particular receiver should be changed to a different transmission mode. FIG. 3 depicts a process flow diagram of a method for evaluating a multiple access wireless link in a wireless communications system that includes a transmitter, a first receiver, and a second receiver and that utilizes a multiple access protocol such as TDMA, FDMA, or CDMA. The transmitter transmits frames intended for the first receiver in a first transmission mode and transmits frames intended for the second receiver in a second mode that is different from the first transmission mode. At step 350, at least one frame that is intended for the second receiver and that is transmitted in the second transmission mode is received at the first receiver. At step 352, an error measure is obtained, at the first receiver, for the at least one received frame that is intended for the second receiver. At decision point 354, a determination is made as to whether or not the second transmission mode is acceptable at least in part based on the obtained error measure. If the second transmission mode is determined to be not acceptable, then the process returns to step 350 and the first receiver receives more frames that are intended for a second receiver. If the second transmission mode is acceptable, then at decision point 356, a determination is made as to whether or not the current transmission mode for the first receiver should be replaced by the second transmission mode. If the current transmission mode for the first receiver should not be replaced by the second transmission mode, then the process returns to step 350 and the first receiver receives more frames that are intended for a second receiver. If the current transmission mode should be replaced by the second transmission mode, then at step 358, an indication is sent to the transmitter to transmit subsequent frames intended for the first receiver in the second transmission mode. The process is then repeated as indicated by return line 360.

The process flow depicted in FIG. 3 can be read in conjunction with FIGS. 1 and 2 where the first receiver is Receiver A 108 and 208, the first (or current) transmission mode is mode X, the second receiver is Receiver B 110, and the second transmission mode is mode Y. Referring to FIGS. 1 and 2, frame $B_1$ 114 (mode Y), which is intended for Receiver B is received by Receiver A. An error measure is made for frame $B_1$ by the error detector 242 shown in FIG. 2 and the error measure is compared to an error threshold by the mode logic 244 to determine if the mode is acceptable. If transmission mode Y is acceptable, then the mode logic determines if mode X (the current transmission mode) should be replaced by mode Y. If mode X is to be replaced by mode Y, then the change in modes is communicated to the transmitter as indicated by the dashed line 248 in FIG. 2 from the mode logic of the receiver to the mode controller 224 of the transmitter 204. Although FIG. 1 depicts a single frame being used to evaluate transmission mode Y, multiple frames may be used to evaluate the transmission mode.

Figure 4:
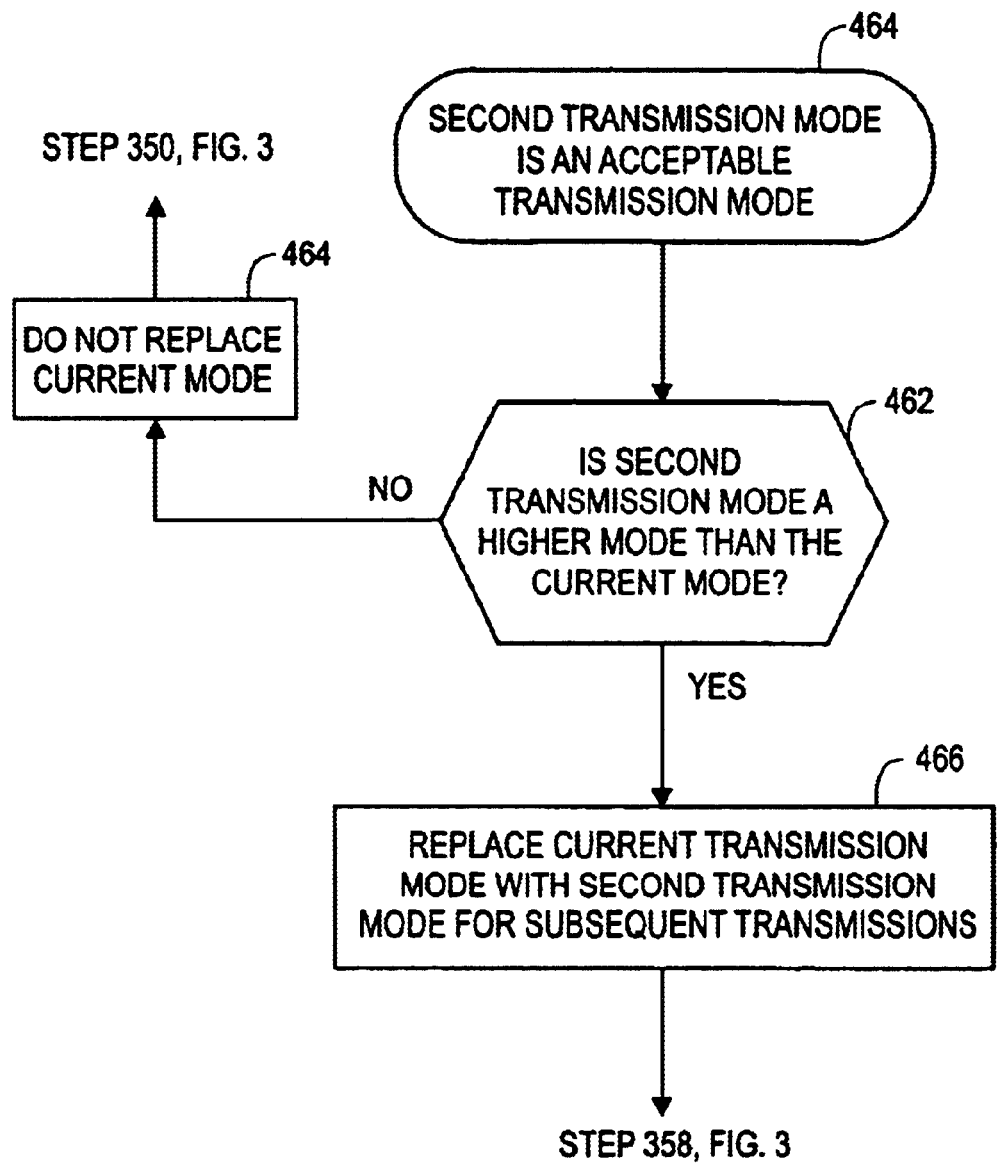
FIG. 4 depicts substeps that flow from an affirmative answer at decision point 354 in FIG. 3.

In an embodiment, the decision of whether or not to replace the current transmission mode with the eavesdrop mode includes comparing a characteristic of the current transmission mode to the same characteristic of the eavesdrop mode. In an embodiment, error measures are made for the frames that are transmitted in the current transmission mode and intended for the receiver as well as the frames that are not intended by the receiver. The error measures can then be used to determine whether to replace the current transmission mode with the eavesdrop mode. In an embodiment, the current transmission mode is compared to the eavesdrop mode to determine whether it should be replaced by the eavesdrop mode. In an embodiment, the current transmission mode of a receiver is only replaced if the eavesdrop mode is a higher mode than the current mode. FIG. 4 depicts substeps that flow from an affirmative answer at decision point 354 in FIG. 3. Referring to FIG. 4, if the second transmission mode is an acceptable mode (starting step 454), then at decision point 462, a determination is made as to whether or not the second transmission mode is a higher transmission mode than the first (or current) transmission mode. If the second transmission mode is not higher than the current transmission mode, then the current transmission mode is not replaced by the second transmission mode (step 464) and the process moves to step 350 of FIG. 3. If the second transmission mode is higher than the current transmission mode, then the current transmission mode is replaced by the second transmission mode (step 466) and the process moves to step 358 of FIG. 3.

An example application of the decision logic described in FIGS. 3 and 4 is depicted in FIG. 5 in a table. The table in FIG. 5 includes five columns. The first column identifies mode decision cycles 1–10. The second column identifies the current mode of the receiver for which the table applies, for example, Receiver A. The third column (titled "Eavesdrop mode that is acceptable") identifies the modes of information that are intended for another receiver, that have been received by Receiver A, and that have been determined to be acceptable. The fourth column identifies the ranking of the current mode versus the subject mode in terms of which transmission mode is a higher mode. The fifth column identifies which mode, of the two modes, should be used for subsequent frame transmissions. In the example, it is assumed that the higher mode is the preferred mode because the higher mode has a higher transmission rate. For example purposes, it is assumed that there are ten transmission modes that may be used in the subscriber area, with the ten transmission modes being ranked from 1–10 (1 being the lowest mode and 10 being the highest mode) and that the receiver's current transmission mode is mode 4. It is also assumed that the highest acceptable transmission mode between the transmitter and Receiver A is transmission mode 8. Although there are ten transmission modes that may be used in the subscriber area, all of the transmission modes are not always being used and therefore Receiver A may not be able to eavesdrop on frames transmitted in all possible modes. That is, the range of transmission modes that can be evaluated by Receiver A is limited to the modes that are active in the subscriber area.

Referring to cycle 1 in FIG. 5, the current mode for Receiver A is mode 4 and the first acceptable eavesdrop mode that is evaluated by Receiver A is mode 2. Mode 4 is a higher mode than mode 2 and therefore the current mode is maintained for subsequent frame transmissions. In cycle 2, the current mode is still mode 4 and the next acceptable eavesdrop mode is mode 5. Mode 5 is higher than mode 4 and therefore mode 4 is replaced by mode 5 as the preferred mode for subsequent transmissions of frames intended for Receiver A. In cycle 3, the current mode is mode 5 and the next acceptable eavesdrop mode that is evaluated by Receiver A is mode 7. Mode 7 is higher than mode 5 and therefore mode 5 is replaced by mode 7 as the preferred mode for subsequent transmission of frames intended for Receiver A. The process continues as described for cycles 4 and 5. At cycle 6, the current transmission mode is lowered from mode 7 to mode 4. Mode lowering may occur because the link conditions have changed. For example, the weather conditions may have changed or the receiver may have traveled into a poor reception area. Some examples of mode lowering logic are described in more detail below. After the mode lowering event, the process continues as described. At cycle 7, the current mode is mode 4 and the next eavesdrop mode that is evaluated by Receiver A is mode 5. Mode 5 is a higher mode than mode 4 and therefore mode 4 is replaced by mode 5 as the preferred mode for subsequent transmission of frames intended for Receiver A. At cycle 8, the preferred mode changes to mode 8, which, for example purposes, is the highest mode for which the error measure is below the error threshold. Because mode 8 is the highest acceptable mode under the given conditions, the current mode will not move any higher than mode 8 unless conditions change such that the error measure for a higher mode drops below the error threshold. In the embodiments of FIGS. 1–5, a receiver only evaluates transmission modes that are being used in the subscriber area and therefore the diversity of the evaluated transmission modes is determined by the diversity of modes being used in the subscriber area.

Figure 6:
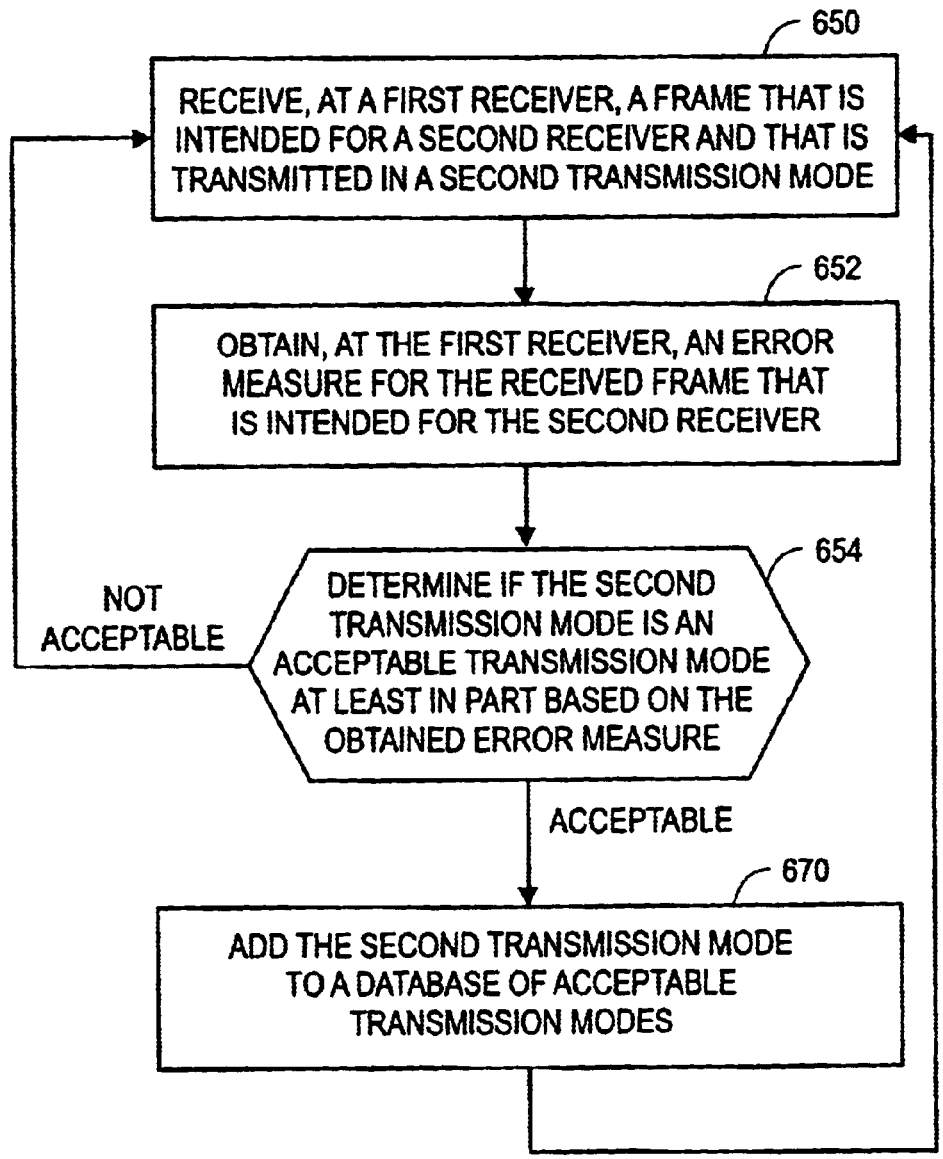
FIG. 6 depicts a process flow diagram of another method for evaluating a wireless link in a wireless communications system that includes a transmitter, a first receiver, and a second receiver.

In another embodiment, the mode acceptability determination is used to build a database of transmission modes that have acceptable error measures under the current operating conditions. FIG. 6 depicts a process flow diagram of another method for evaluating a wireless link in a wireless communications system that includes a transmitter, a first receiver, and a second receiver. The communications system uses a multiple access protocol and the transmitter transmits frames intended for the first receiver in a first transmission mode and transmits frames intended for the second receiver in a second transmission mode. At step 650, at least one frame that is intended for the second receiver and that is transmitted in the second transmission mode is received at the first receiver. At step 652, an error measure is obtained, at the first receiver, for the at least one received frame that is intended for the second receiver. At decision point 654, a determination is made as to whether or not the second transmission mode is acceptable based at least in part based on the obtained error measure. If the second transmission mode is not acceptable, then the process returns to step 650 and the first receiver receives additional frames that are intended for a second receiver. If the second transmission mode is acceptable, then at step 670, the second transmission mode is added to a database of acceptable transmission modes.

Referring back to FIG. 2, the mode database 246 stores the transmission modes that are determined to be acceptable at decision point 654. In an embodiment, the acceptable transmission modes within the mode database may be ranked by some parameter. For example, the acceptable transmission modes may be ranked from highest to lowest mode. In another embodiment, error statistics related to the acceptable modes are collected in the mode database. Error statistics may include a running average of the BER over a specified period of time (e.g., for the last sixty seconds). FIG. 7 depicts an example of mode information that may be stored in the mode database. The mode information includes a ranked list of acceptable transmission modes and an example error statistic for each transmission mode including the current mode.

The information stored in the mode database 246 can be used by the mode logic 244 to determine if a different transmission mode should be used for subsequent transmission of frames intended for the particular receiver. Referring to FIG. 7, a current mode pointer indicates that transmission mode 4 is the current transmission mode. Because there are higher transmission modes that have been evaluated and that have shown to be acceptable, the receiver could switch to a higher mode without exceeding the error threshold. In an embodiment, the mode logic may consider the error statistics to determine if a new mode should be used and to determine what the new mode should be. In an embodiment, the mode logic makes incremental mode decisions. That is, the mode logic changes the current transmission mode one mode at a time, either to a higher mode or to a lower mode.

In an embodiment, the mode logic 244 can use the mode information in the mode database 246 to determine if the current mode is too high or too low. For example, if the highest acceptable transmission mode is higher than the current mode, then the current mode should be changed to be at least as high as the highest transmission mode to ensure that the highest acceptable mode is being used. Alternatively, if the highest acceptable transmission mode is below the current mode, then the current mode should be changed to be no higher than the highest acceptable transmission mode to ensure that the current mode is acceptable.

In an embodiment, the information stored in the mode database is used by the mode logic to project the acceptability of other transmission modes. For example, an evaluated transmission mode may be similar enough to an un-evaluated transmission mode that the acceptability of the un-evaluated transmission mode can be determined to a high degree of confidence. In the embodiment, an un-evaluated mode is a mode that is not presently being used in the subscriber area and therefore cannot be directly evaluated through actual received frames.

In an embodiment, the mode information stored in the mode database is used by the mode logic to make mode lowering decisions. For example, if error measures obtained for the current mode indicate that the current mode is unacceptable, then the mode logic can utilize information in the mode database to determine if there is an acceptable mode that can replace the current transmission mode. If there are no other identified acceptable modes, then the current mode can be dropped to a default mode, for example, the lowest mode that is used in the system. If there are acceptable modes identified in the mode database, then the current mode can be switched to one of the acceptable modes. In an embodiment, a mode selection algorithm is used to select the best mode among the group of acceptable modes, for example the highest acceptable mode. In an embodiment, the mode selection algorithm may take into account an error statistic that is included in the mode database.

In an embodiment, mode information in the mode database is stored for a limited amount of time. Mode information may be replaced during regular time intervals so that the mode logic is not making mode decisions based on performance information that does not reflect the current operating conditions. For example, a running BER may be calculated only for frames received in the previous ten seconds. In another embodiment, mode information in the mode database is accumulated based on time of arrival. Current mode information is given more weight than older mode information. For example the BER of frames received in the last second is more important than the BER of frames received ten seconds ago and thus should be given more weight.

Figure 8:
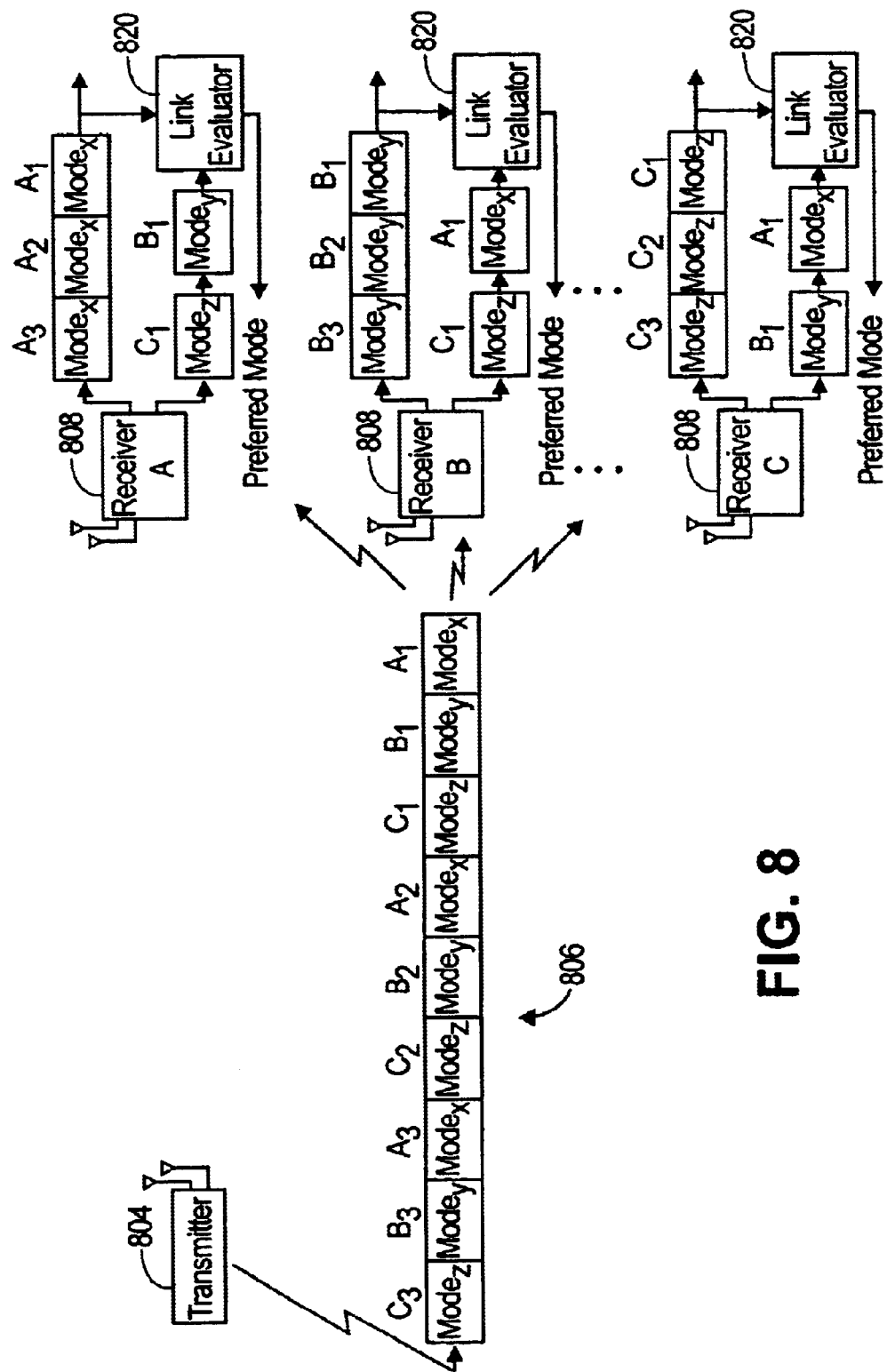
FIG. 8 represents a technique for evaluating a wireless link between a transmitter and multiple receivers in a multiple access wireless communications system in accordance with an embodiment of the invention.

Although the technique for evaluating a wireless link is described with reference to two receivers, the technique is applicable to a multiple access communications system that includes multiple receivers. FIG. 8 depicts an example of how the technique for evaluating wireless links scales with multiple receivers. As shown in FIG. 8, the receivers 808 are able to receive the frames that are intended for the respective receivers and are also able to eavesdrop on frames intended for other receivers for the purpose of evaluating the performance of different transmission modes. The benefits of eavesdropping on frames intended for other receivers is enhanced when there is a good distribution of transmission modes in use in the subscriber area. For example, in FIG. 8, the transmitter 804 is using a different transmission mode (modes X, Y, and Z) for each of the receivers. According to this example, each receiver can evaluate the performance of two transmission modes that are different from its current transmission mode. This technique can be scaled up for use in a multiple access wireless communications system that includes hundreds to thousands of subscriber units using tens to hundreds of different transmission modes within the subscriber area. An advantage of the technique is that even in a highly scaled environment, the receivers can adapt their transmission modes in response to actual performance information to achieve the best link performance without consuming valuable bandwidth with training frames.

What is claimed is:

1. A method for evaluating a wireless link between a transmitter and a first receiver in a multiple access wireless communications system, wherein said transmitter is transmitting information intended for a first receiver in a first transmission mode and information intended for said second receiver in a second transmission mode that is different from said first transmission mode, comprising:

receiving, at said first receiver, said information that is intended for said second receiver and that is transmitted in said second transmission mode;

obtaining, at said first receiver, an error measure for said information that is received at said first receiver and intended for said second receiver; and determining if said second transmission mode is an acceptable transmission mode at least in part based on said error measure obtained for said information that is received at said first receiver and intended for said second receiver.

2. The method of claim 1 further including a step of determining if said second transmission mode should be used for subsequent transmissions of information frames that is intended for said first receiver only if said second transmission mode is determined to be acceptable.

3. The method of claim 2 wherein said step of determining if said second transmission mode should be used for subsequent transmissions of information includes a step of comparing a characteristic of said second transmission mode to said first transmission mode.

4. The method of claim 2 wherein said step of determining if said second transmission mode should be used for subsequent frame transmissions includes steps of:

determining if said second transmission mode is higher than a current transmission mode that is used to transmit information intended for said first receiver;

if said second transmission mode is determined to be higher than said current transmission mode, then using said second transmission mode for subsequent transmissions, from said transmitter, of information intended for said first receiver; and if said second transmission mode is determined to be lower than said current transmission mode, then continuing to use said current transmission mode for subsequent transmissions, from said transmitter, of information intended for said first receiver.

5. The method of claim 2 further including a step of indicating to said transmitter that said second transmission mode should be used for subsequent transmissions of frames intended for said first receiver.

6. The method of claim 5 further including a step of indicating to multiple transmitters that said selected transmission mode should be used for subsequent transmissions of frames intended for said first receiver.

7. The method of claim 5 further including a step of transmitting subsequent frames to said receiver in said second transmission mode.

8. The method of claim 1 wherein said step of determining if said second transmission mode is acceptable includes a step of determining if said obtained error measure is above or below an error threshold.

9. The method of claim 1 further including a step of adding said second transmission mode to a database of acceptable transmission modes only if said obtained error measure for said information transmitted in said second transmission mode is below an error threshold.

10. The method of claim 9 further including a step of selecting a lower transmission mode for information intended for said first receiver from acceptable modes identified in said database.

11. The method of claim 9 further including a step of ranking transmission modes that are added to said database of acceptable transmission modes.

12. The method of claim 11 further including a step of selecting a new transmission mode for information intended for said first receiver at least in part based on said transmission mode rankings.

13. The method of claim 12 further including a step of accumulating error statistics for transmission modes that are added to said database of acceptable transmission modes.

14. The method of claim 13 further including a step of selecting a new transmission mode for information intended for said first receiver at least in part based on said accumulated error statistics.

15. The method of claim 9 further including a step of replacing a current transmission mode with the next higher acceptable transmission mode that is stored in said database of acceptable modes.

16. The method of claim 1 further including a step of projecting the acceptability of other transmission modes that may be used to transmit information intended for said first receiver based at least in part on said mode acceptability determination of said information that is intended for said second receiver and transmitted in said second transmission mode.

17. The method of claim 1 further including steps of:

if said second transmission mode is not acceptable, then ensuring that said first transmission mode used by said transmitter to transmit information intended for said first receiver is no higher than said second transmission mode; and if said second transmission mode is acceptable, then ensuring that said first transmission mode used by said transmitter to transmit information intended for said first receiver is at least as high as said second transmission mode.

18. The method of claim 1 further including a step of decoding said information intended for said second receiver into decoded information before said error measure is obtained, said error measure being related to said decoded information.

19. The method of claim 18 wherein said step of obtaining said error measure includes utilizing information selected from the group consisting of the metric of a winning path in a Virterbi decoder, the output bit/symbol/packet likelihood, a cyclic redundancy check code, a parity check code, a Reed-Solomon code, a BCH code, a Hamming code, a cyclic code, an arithmatic code, and a Golay code.

20. The method of claim 1 wherein said error measure for said information is obtained prior to decoding.

21. The method of claim 20 wherein said step of obtaining an error measure includes utilizing information selected from the group consisting of the means square error of equalizer, a measure of equalizer convergence, and post-processing signal to noise plus interference ratio.

22. The method of claim 1 wherein said transmitter transmits said information from multiple antennas.

23. The method of claim 1 wherein said multiple access wireless communications system utilizes a multiple access protocol that is selected from at least one of a group of multiple access protocols consisting of: time-division multiple access (TDMA), frequency-division multiple access (FDMA), code-division multiple access (CDMA), space-division multiple access (SDMA), orthogonal frequency division multiple access (OFDMA), wavelength division multiple access (WDMA), wavelet division multiple access, orthogonal division multiple access (ODMA), quasi-ODMA, packet reservation multiple access (PRMA), and carrier sense multiple access (CSMA).

24. A system for evaluating a wireless link in a multiple access wireless communications system comprising:
  a transmitter;
  a first receiver;
  a second receiver;
    said transmitter including means for transmitting information intended for said first receiver in a first transmission mode and for transmitting information intended for said second receiver in a second transmission mode that is different from said first transmission mode;
    said first receiver including:
      means for receiving, from said transmitter, said information that is intended for said second receiver and that is transmitted in said second transmission mode;
      means for obtaining an error measure for said information that is received at said first receiver and intended for said second receiver; and
      means for determining if said second transmission mode is an acceptable transmission mode at least in part based on said error measure obtained for said information.

25. The system of claim 24 wherein said means for determining includes mode logic for determining if said second transmission mode should be used for subsequent transmissions of information that is intended for said first receiver only if said second transmission mode is determined to be acceptable.

26. The system of claim 25 wherein said mode logic includes logic for:
  determining if said second transmission mode is higher than a current transmission mode that is used to transmit information intended for said first receiver;
  if said second transmission mode is determined to be higher than said current transmission mode, then using said second transmission mode for subsequent transmissions, from said transmitter, of information intended for said first receiver; and
  if said second transmission mode is determined to be lower than said current transmission mode, then continuing to use said current transmission mode for subsequent transmissions, from said transmitter, of information intended for said first receiver.

27. The system of claim 25 wherein said transmitter includes a mode controller for controlling the transmission mode that is used to transmit information from said transmitter, and wherein said first receiver includes means for communicating a preferred transmission mode to said mode controller.

28. The system of claim 27 wherein said transmitter is located in a base transceiver station and wherein said receiver is located in a subscriber unit.

29. The system of claim 24 wherein said means for determining includes mode logic for determining if said obtained error measure is above or below an error threshold.

30. The system of claim 24 wherein said first receiver includes a mode database and wherein said means for determining includes mode logic for adding said second transmission mode to said mode database only if said second transmission mode is determined to be acceptable.

31. The system of claim 30 wherein said mode logic includes means for ranking transmission modes that are added to said mode database.

32. The system of claim 31 wherein said mode logic includes means for selecting a new transmission mode for information intended for said first receiver at least in part based on said transmission mode rankings.

33. The system of claim 32 wherein said mode logic includes means for selecting a new transmission mode for information intended to said first receiver at least in part based on said accumulated error statistics.

34. The system of claim 30 wherein said mode logic includes means for accumulating error statistics for transmission modes that are added to said mode database.

35. The system of claim 30 wherein said mode logic includes means for replacing a current transmission mode with the next higher acceptable transmission mode that is stored in said mode database.

36. The system of claim 24 wherein said first receiver includes mode logic for projecting the acceptability of other transmission modes that may be used to transmit information intended for said first receiver based at least in part on the determinations made from said means for determining if said second transmission mode is acceptable.

37. The system of claim 24 wherein said means for obtaining an error measure is connected to a decoder for detecting errors in said information after said information has been decoded by said decoder.

38. The system of claim 24 wherein said means for obtaining an error measure is connected to a receive processor for detecting errors in said frames prior to information decoding.

39. The system of claim 24 wherein said receiver includes a mode identification unit for identifying the transmission mode of received information and for outputting transmission mode information.

40. The system of claim 24 wherein said transmitter includes multiple antennas for transmitting frames.

41. The system of claim 24 wherein said multiple access wireless communications system utilizes a multiple access protocol that is selected from at least one of a group of multiple access protocols consisting of: time-division multiple access (TDMA), frequency-division multiple access (FDMA), code-division multiple access (CDMA), space-division multiple access (SDMA), orthogonal frequency division multiple access (OFDMA), wavelength division multiple access (WDMA), wavelet division multiple access, orthogonal division multiple access (ODMA), quasi-ODMA, packet reservation multiple access (PRMA), and carrier sense multiple access (CSMA).

42. A system for evaluating a wireless link in a multiple access wireless communications system comprising:
- a transmitter;
- a first receiver;
- a second receiver;
    - said transmitter including means for transmitting frames of information intended for said first receiver in a first transmission mode and for transmitting frames of information intended for said second receiver in a second transmission mode that is different from said first transmission mode;
    - said first receiver including:
        - means for receiving, from said transmitter, at least one of said frames that is intended for said second receiver and that is transmitted in said second transmission mode;
        - a frame decoder for decoding said at least one frame that is received at said first receiver and intended for said second receiver into decoded frame information.
        - error detector, connected to said frame decoder, for obtaining an error measure from said decoded frame information for said at least one frame that is received at said first receiver and intended for said second receiver;
        - mode logic, connected to said error detector, for determining if said second transmission mode is an acceptable transmission mode at least in part based on said error measure obtained by said error detector for said at least one frame.

43. The system of claim 42 further including a mode identification for identifying the transmission mode of said at least one frame that is received at said first receiver and intended for said second receiver.

44. The system of claim 43 wherein said mode logic includes means for determining if said second transmission mode should be used for subsequent frame transmissions of frames that are intended for said first receiver only if said second transmission mode is determined to be acceptable.

45. The system of claim 43 wherein said first receiver includes a mode database accessible to said mode logic and wherein said mode logic includes means for adding said second transmission mode to said mode database only if said second transmission mode is determined to be acceptable.

46. The system of claim 45 wherein said mode logic includes means for ranking transmission modes that are added to said mode database.

47. The system of claim 46 wherein said mode logic includes means for selecting a new transmission mode for frames intended for said first receiver at least in part based on said transmission mode rankings.

48. The system of claim 45 wherein said mode logic includes means for accumulating error statistics for transmission modes that are added to said mode database.

49. The system of claim 48 wherein said mode logic includes means for selecting a new transmission mode for frames intended to said first receiver at least in part based on said accumulated error statistics.

50. The system of claim 42 wherein said mode logic includes means for projecting the acceptability of other transmission modes that may be used to transmit frames intended for said first receiver based at least in part on whether said second transmission mode is determined to be acceptable.

51. The system of claim 42 wherein said transmitter includes multiple antennas for transmitting frames.

52. The system of claim 42 wherein said multiple access wireless communications system utilizes a multiple access protocol that is selected from at least one of a group of multiple access protocols consisting of: time-division multiple access (TDMA), frequency-division multiple access (FDMA), code-division multiple access (CDMA), space-division multiple access (SDMA), orthogonal frequency division multiple access (OFDMA), wavelength division multiple access (WDMA), wavelet division multiple access, orthogonal division multiple access (ODMA), quasi-ODMA, packet reservation multiple access (PRMA), and carrier sense multiple access (CSMA).

* * * * *